United States Patent [19]

Ishihara

[11] Patent Number: 5,476,325
[45] Date of Patent: Dec. 19, 1995

[54] BALL SPLINE

[75] Inventor: Toyohisa Ishihara, Seki, Japan

[73] Assignee: Nippon Thompson Co., Ltd., Tokyo, Japan

[21] Appl. No.: 391,017

[22] Filed: Feb. 21, 1995

[30] Foreign Application Priority Data

Feb. 23, 1994 [JP] Japan .................... 6-047930

[51] Int. Cl.⁶ .................................. F16C 29/06
[52] U.S. Cl. .................................. 384/43
[58] Field of Search .................. 384/43, 44, 45

[56] References Cited

U.S. PATENT DOCUMENTS

| | | | |
|---|---|---|---|
| 4,512,617 | 4/1985 | Saravis et al. | 384/43 |
| 4,629,337 | 12/1986 | Teramachi | 384/43 |
| 4,695,170 | 9/1987 | Teramachi | 384/43 X |
| 4,936,692 | 6/1990 | Tanaka | 384/43 |

FOREIGN PATENT DOCUMENTS

| | | |
|---|---|---|
| 53-22209 | 7/1978 | Japan . |
| 58-52317 | 4/1983 | Japan . |
| 0361046 | 9/1991 | Japan . |

*Primary Examiner*—Thomas R. Hannon
*Attorney, Agent, or Firm*—Browdy and Neimark

[57] ABSTRACT

This ball spline is capable of omitting ball retaining claws on an outer cylinder, forming by grinding raceway grooves in an inner surface of the outer cylinder easily with a high precision, positioning and fixing retainers simply on the outer cylinder, and reducing the manufacturing cost. In this ball spline, each of the retainers is formed by a pair of ball retaining units, which are fastened to the outer cylinder by engaging outer projections formed on the ball retaining units with grooves formed in the outer cylinder. The locking bores in spacer rings are engaged with locking projections on the ball retaining units, whereby the spacer rings are fixed to the ball retaining units.

10 Claims, 9 Drawing Sheets

BALL SPLINE

BACKGROUND OF THE INVENTION

1. Field of the Invention

This invention relates to a ball spline in which an outer cylinder is moved slidingly on and relatively to a ball spline shaft via balls.

2. Description of the Prior Art

A ball spline in which an outer cylinder member having a plurality of balls is moved linearly along a ball spline shaft has heretofore been applied to an industrial robot and a transfer machine. Such known ball splines include a ball spline provided with retainers for holding a plurality of balls, and a ball spline not provided therewith.

Figure 16:
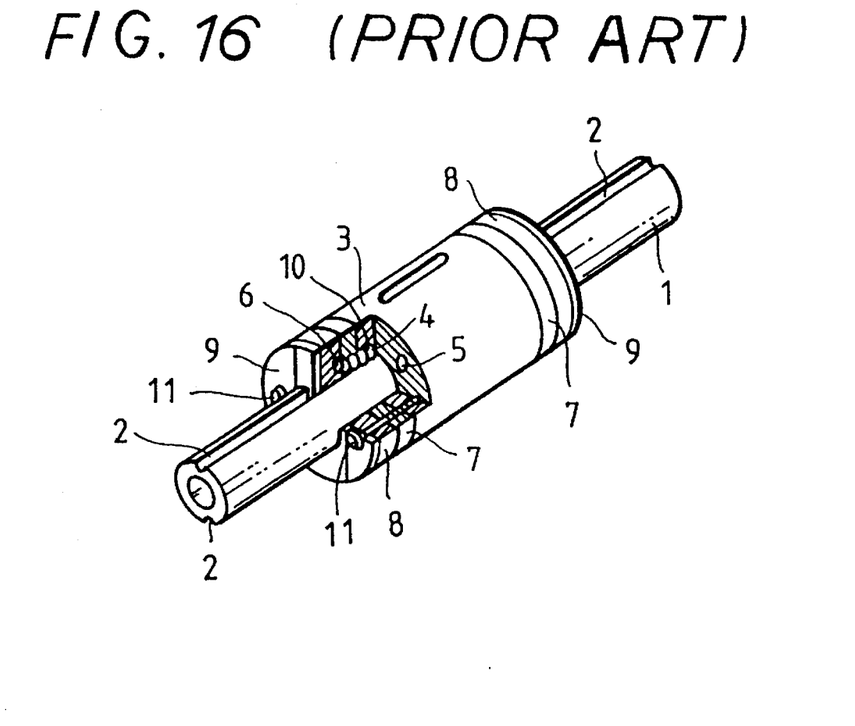
FIG. 16 is a partially cutaway view in perspective showing an example of a conventional ball spline.

Known ball splines not provided with retainers include a ball spline shown in FIG. 16. This ball spline has a ball spline shaft 1 provided with a plurality of raceway grooves 2 in predetermined portions of an outer circumferential surface thereof so that the raceway grooves extend in the axial direction, and an outer cylinder body 3 provided with a hollow at which the outer cylinder body 3 is fitted slidably around the ball spline shaft 1. The hollow of the outer cylinder body 3 is provided in its inner circumferential surface with raceway grooves 4 opposed to the raceway grooves 2 in the ball spline shaft 1, and return passages 5. The ball spline further has spacer rings in which direction conversion passages 6 are formed, end caps 8, end seals 9, and balls 10 fitted between the opposed raceway grooves. The spacer rings 7, end caps 8 and end seals 9 are secured to both sides of the outer cylinder body 3 with bolts 11. In order to retain the balls 10, the width in cross section of the openings at the edge portions of the raceway grooves 4 formed in the outer cylinder body 3 is set smaller than the diameter of the balls 10 (refer to, for example, Japanese Patent Publication No. 61046/1991).

Although the ball spline shown in FIG. 16 has ball retainers at side edge portions of the raceway grooves 4 in the outer cylinder 3, it is difficult to form ball retainer-carrying raceway grooves 4, and, especially, finishing such raceway grooves is difficult. It is also difficult to accurately set the shapes of the raceway grooves 4 of ball load regions formed in the outer cylinder body 3, and direction conversion passages 6 formed in the spacer rings 7 and side rings 8.

Figure 17:
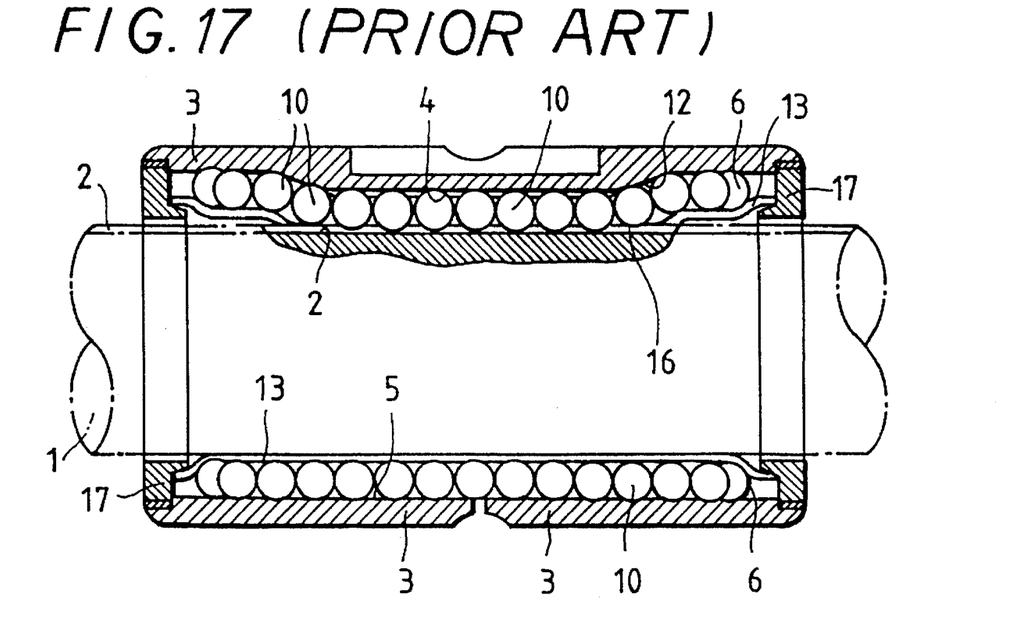
FIG. 17 is a sectional view showing another example of a conventional ball spline.

The conventional retainer-carrying ball splines include a ball bearing shown in FIG. 17. This ball bearing comprises a ball spline shaft 1 provided with a plurality of raceway grooves 2 in predetermined portions of an outer circumferential surface thereof so that the raceway grooves extend in the axial direction, an outer cylinder body 3 provided in its inner surface with raceway grooves 4 opposed to those 2 in the ball spline shaft 1, and in its inner surface with inclined surface portions 12 adapted to change the direction in which the balls 10 roll, retainers 13 holding the balls 10 on the inner surface of the outer cylinder body 3, and a plurality of balls 10. Each retainer 13 is formed to a thin-walled seamless cylinder. The portion of the retainer 13 which is opposed to the balls 10 in a no-load region of the return passage 5 is formed to a larger height, i.e., on the diametrically outer side, and the portion of the retainer 13 which is opposed to the balls 10 in a load region to a smaller height, i.e., on the diametrically inner side. The retainer 13 is further provided with an elongated bore 16 so that the balls 10 rolling in the load region project slightly therefrom. The retainer 13 is fastened to the outer cylinder body 3 by screwing covering nuts 17 into both side portions of the inner circumferential surface thereof (refer to, for example, Japanese Utility Model Laid-Open No. 52317/1983).

The ball spline shown in FIG. 17 is provided at both of the axial end sections of a ball load region of each raceway groove 4 in the outer cylinder 3 with an escape portion formed by an inclined recess so as to guide the balls rolling in the direction conversion passage 6 in the retainer 13. Consequently, the forming of the raceway grooves 4 in the outer cylinder 3 becomes difficult, and the manufacturing cost increases. In a conventional ball spline, it is necessary that the raceway grooves in the outer cylinder body 3 in which the retainers 13 are provided be subjected to hardening. It is also difficult to form portions, in which the retainers 13 are provided, in the outer cylinder body 3, so that the cost of manufacturing the outer cylinder body 3 becomes high.

Figure 18:
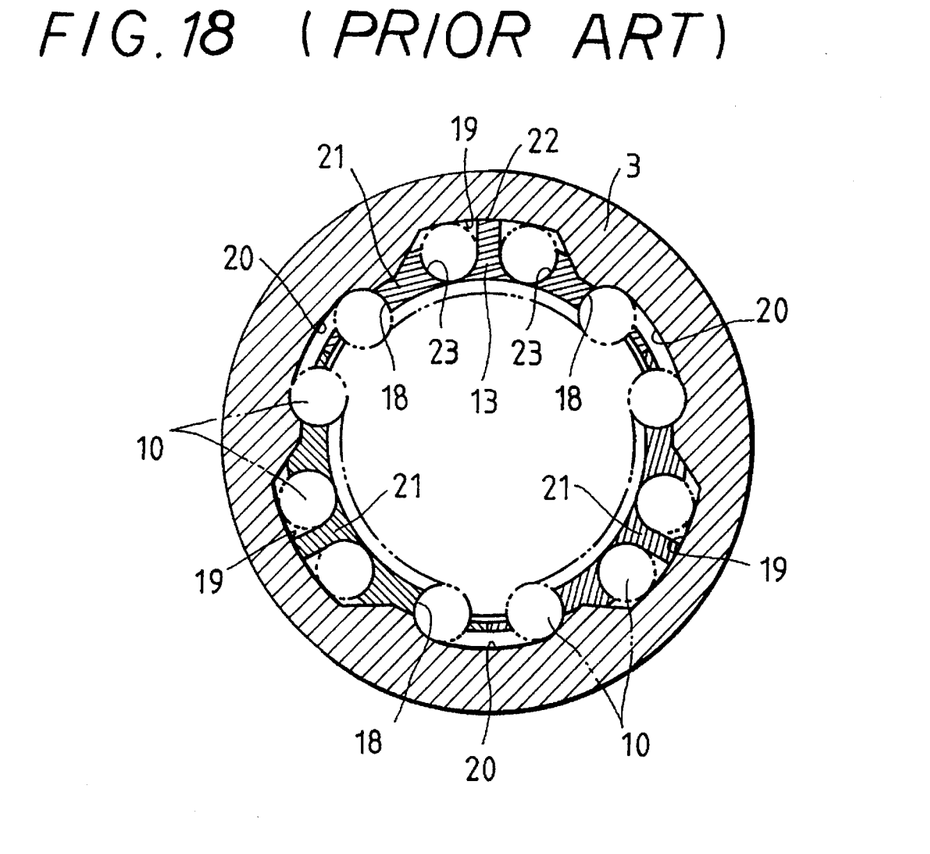
FIG. 18 is a sectional view showing still another example of a conventional ball spline.
Figure 19:
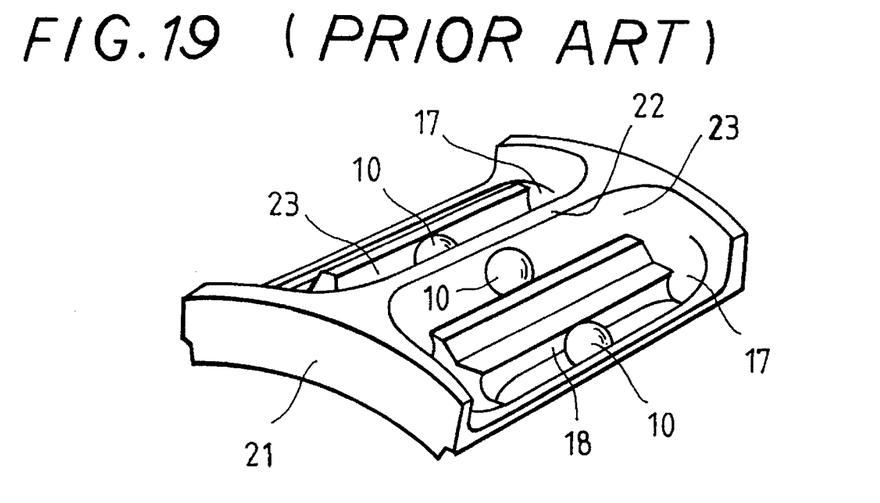
FIG. 19 is a perspective view showing a retainer in the example of FIG. 18.

Ball splines in which retainers are formed in a divided manner as mentioned above include an endlessly sliding ball spline bearing (refer to, for example, Japanese Patent Publication No. 22209/1978) shown in FIGS. 18 and 19. In this ball spline bearing, torque transmitting no-load ball guide recesses 19 of a larger depth and torque transmitting load ball guide recesses 20 the depth of which is slightly smaller than that of the torque transmitting no-load ball guide recesses 19 are formed alternately in an inner surface of an outer cylinder 3, from which these depths are measured, in such a manner that these guide recesses extend axially. Both side portions of each load ball guide recess 20 has a radius of curvature close to that of balls. Each retainer 13 guiding the torque transmitting no-load balls 10 and torque transmitting load balls 10 is formed by equally divided segments 21. Each segment 21 is provided with return passages 23, which are opposed to the no-load ball guide recesses 19, on both sides of axially extending parting walls 22 positioned in the central portions of the no-load ball guide recesses 19, elongated bores 18 opposed to the load ball guide recesses 20 and wide enough to prevent the load balls from falling therethrough, and direction conversion guide passages 17 enabling the balls to move therebetween. After the segments 21 loaded with a plurality of balls 10 in the return passages 23 and on the elongated bores 18 have been fitted in the outer cylinder 3, rings are fitted around both end portions of all of the segments 21 to finish assembling the ball spline bearing. In this ball spline bearing, the inserting of the balls 10 and the fitting of the segments 21 in the outer cylinder 3 are difficult.

SUMMARY OF THE INVENTION

A primary object of the present invention is to solve the above-mentioned problems, and provide a ball spline capable of facilitating the production of an outer cylinder and retainers by forming these parts to simple shapes without providing ball retaining claws on raceway groove-carrying outer cylinder; improving a processing precision; attaining the positioning of parts, such as the outer cylinder and retainers easily and reliably during the assembly of these parts; positioning the retainers with respect to the raceway grooves in the outer cylinder and fastening the retainers to the outer cylinder simply; inserting balls in endless ball circulating passages easily; and reducing the assembling and manufacturing costs.

The present invention relates to a ball spline which has a ball spline shaft provided with first raceway grooves in an outer surface thereof so that these raceway grooves extend in the lengthwise direction of the ball spline shaft; an outer cylinder fitted around the ball spline shaft and provided with second raceway grooves in the portions of an inner surface thereof which are opposed to the first raceway grooves, in such a manner that the second raceway grooves extend in the lengthwise direction of the outer cylinder, and return bores formed so as to be spaced from the second raceway grooves; retainers holding balls, which roll between the first and second raceway grooves, in cooperation with the outer cylinder; spacer rings which are provided with passages respectively communicating with the second raceway grooves and return bores, and which are disposed at both ends of the outer cylinder; end caps which are provided with direction conversion passages communicating with the passages in the spacer rings, and which are disposed on the end surfaces of the spacer rings; and end seals disposed on the end surfaces of the end caps, each of the retainers being formed by a pair of ball retaining units provided with ball retaining surfaces extending along the second raceway grooves in the outer cylinder, the ball retaining units arranged on the inner surface of the outer cylinder being engaged with and held by the spacer rings.

In this ball spline, each retainer can be formed by a pair of ball retaining units having ball retaining surfaces extending along the raceway grooves in the outer cylinder, and it can be supported on the relative spacer ring by merely arranging the ball retaining units on the lengthwise extending inner surface of the outer cylinder and engaging at least one end portion of the respective ball retaining units with the spacer ring. Especially, the outer cylinder need not be provided with ball retaining claws along the edge portions of the raceway grooves unlike a conventional outer cylinder, and the ball retaining function can be provided by side surfaces of the ball retaining units in the retainers fixed to the inner surface of the outer cylinder.

This ball spline does not require a complicated machining process for forming ball retaining members in the raceway grooves in the outer cylinder. The retainers in this ball spline can be formed to the same simple shape so that they extend in the lengthwise direction. The outer cylinder need not be provided with inclined surfaces for changing the direction of rolling of the balls and portions on which the retainers are to be fastened unlike a conventional outer cylinder. In the outer cylinder in the present invention, ball retaining claws which are difficult to be produced are not formed, and the raceway grooves in the same are formed by making therein simple, straight, lengthwise extending grooves. Since these grooves can be formed simply by a grinding process, the precision of the outer cylinder can be improved, and the ball spline manufacturing cost can be reduced.

Each retaining unit in the retainers may be formed to an arcuate part having a ball retaining surface at one side thereof, and the process for the production thereof is very simple. The ball retaining units may be formed unitarily with one spacer ring, or they may be formed so as to be fitted in locking bores formed in one spacer ring. In the case of ball retaining units to be fitted in recesses formed along the second raceway grooves in the outer cylinder, they can be circumferentially positioned, so that the ball retaining units can be fastened to the outer cylinder very simply. Since the ball retaining unit has a flat or columnar structure having ball retaining surface at one side thereof, the production thereof can be carried out very simply, and the ball retaining unit manufacturing cost can be reduced.

The balls may be inserted between the ball retaining units and raceway grooves in the outer cylinder, or from the return bores into the endless circulating passages. Accordingly, the loading of the balls can be done easily in a short period of time.

The outer cylinder is further provided with first grooves formed along and on both sides of the second raceway grooves, and second grooves formed along the first grooves so as to be spaced therefrom. Each of the ball retaining units has in its outer surface first outer projections fitted in the first grooves, and second outer projections fitted in the second grooves, all of which projections extend in the lengthwise direction of the ball retaining unit. Therefore, the ball retaining units provided on both sides of the second raceway grooves in the outer cylinder are restricted by the engagement of the grooves and outer projections with each other, and the clearances between the ball retaining units are maintained securely and reliably. Accordingly, even when a plurality of balls roll between the ball retaining surfaces of the ball retaining units, i.e., in the hollows defined by these ball retaining surfaces, the width of these hollows does not increase, and the balls can roll smoothly between the first and second raceway grooves. The ball retaining units are formed arcuately in accordance with the cross-sectional shape of the inner surface of the outer cylinder, and the ball retaining surfaces are formed at one side of lengthwise extending portions of the ball retaining units. Therefore, the arcuate surfaces of the ball retaining units can function as a reinforcing structures for preventing the expansion of the hollows between the ball retaining surfaces of the ball retaining units, i.e. an increase in the width of these hollows.

If the ball retaining units are formed unitarily with one spacer ring, the other spacer ring to be engaged with a free end portions of the ball retaining units can be combined therewith easily. The ball retaining units can be formed separately from the spacer rings, and, in such a case, locking projections are formed on the end portions of the ball retaining units, and locking bores in the spacer rings. The ball retaining units can be positioned and held easily with respect to the spacer rings by merely engaging the locking projections and locking bores with each other.

The circumferential positioning of the ball retaining units with respect to the outer cylinder can be done by fitting the first and second projections of the ball retaining units in the first and second grooves in the side surfaces of the raceway grooves in the outer cylinder, so that the fixing of the ball retaining units to the outer cylinder becomes very simple. The outer cylinder and spacer rings are positioned by engaging the spacer rings fixed to the outer cylinder with the ball retaining units. Since the end caps and spacer rings are formed by positioning means which are positioned by being engaged with each other, they can be positioned very easily and reliably. These positioning means are formed by recesses provided in the spacer rings and projections provided on the end caps and engageable with these recesses.

The end caps and end seals are provided with positioning means which are positioned by being engaged with each other. The spacer rings and end caps are provided in their outer surfaces with arcuately cut escape recesses which are opposed to each other.

DESCRIPTION OF THE PREFERRED EMBODIMENT

An embodiment of the ball spline according to the present invention will now be described with reference to FIGS. 1–15. In FIGS. 1–15 showing an embodiment of this ball spline, the parts thereof which have the same operation as those in FIGS. 16–19, which illustrate conventional ball splines, are designated by the same reference numerals.

Figure 1:
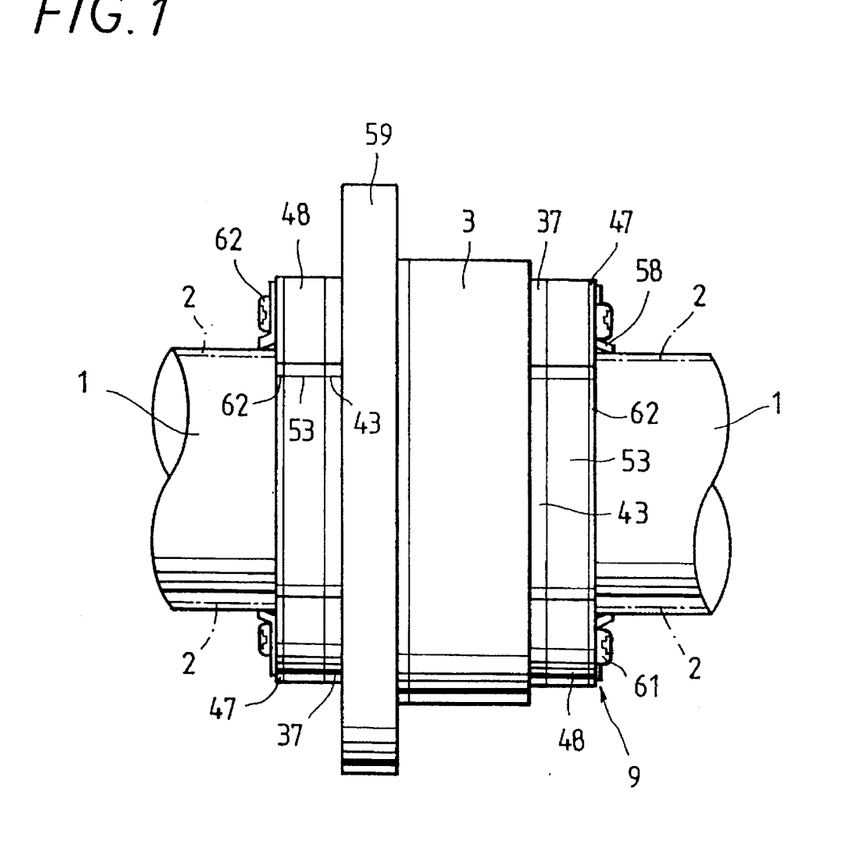
FIG. 1 is a schematic plan showing an embodiment of the ball spline according to the present invention.
Figure 2:
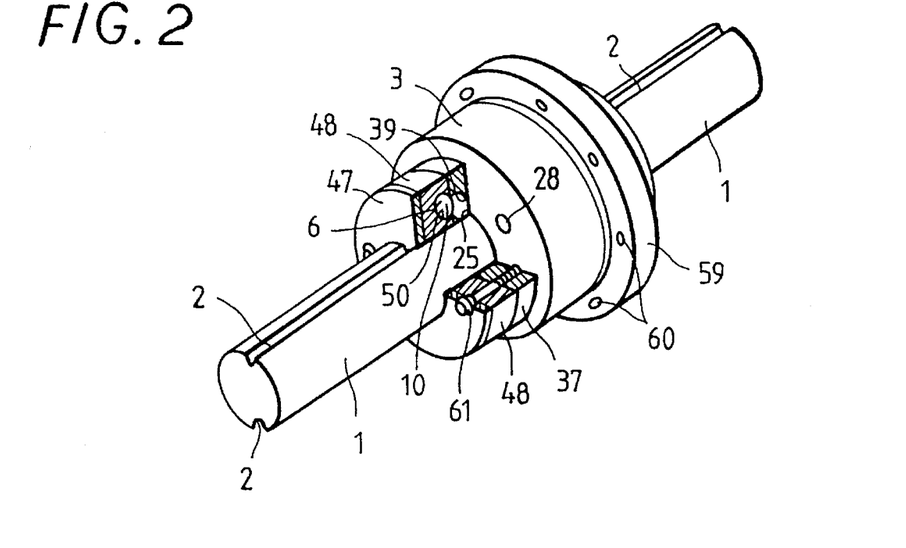
FIG. 2 is a partially cutaway schematic perspective view showing the ball spline of FIG. 1.

As shown in FIGS. 1 and 2, the ball spline according to the present invention is provided with a ball spline shaft 1 having raceway grooves 2 (first raceway grooves) formed in an outer surface thereof so as to extend in the lengthwise direction thereof; an outer cylinder 3 fitted around the ball spline shaft 1 and having raceway grooves 25 (second raceway grooves) formed in the portions of an inner surface thereof which are opposed to the raceway grooves 2, so as to extend in the lengthwise direction thereof, and return bores 28 forming return passages extending along the raceway grooves 25 so as to be spaced therefrom; a retainer adapted to retain a plurality of balls 10 rolling in the outer cylinder 3; spacer rings 37 having communication grooves 39 and communication bores 40 (passages) which communicate with the raceway grooves 25 and return bores 28 respectively, and disposed at both ends of the outer cylinder; end caps 48 having direction conversion passages 6 communicating with the passages 39 in the spacer rings 37, and disposed on end surfaces of the spacer rings 37; and end seals 9 disposed on end surfaces of the spacer rings.

Especially, the retainer is formed by a pair of ball retaining units 31 having ball retaining surfaces 33 extending along both sides of the raceway grooves 25 in the outer cylinder 3. The ball retaining units 31 are provided on an inner surface 24 of the outer cylinder 3, and, when at least one end portion of each ball retaining unit 31 is engaged with a spacer ring 37, the ball retaining unit 31 is retained by the spacer ring 37.

Figure 3:
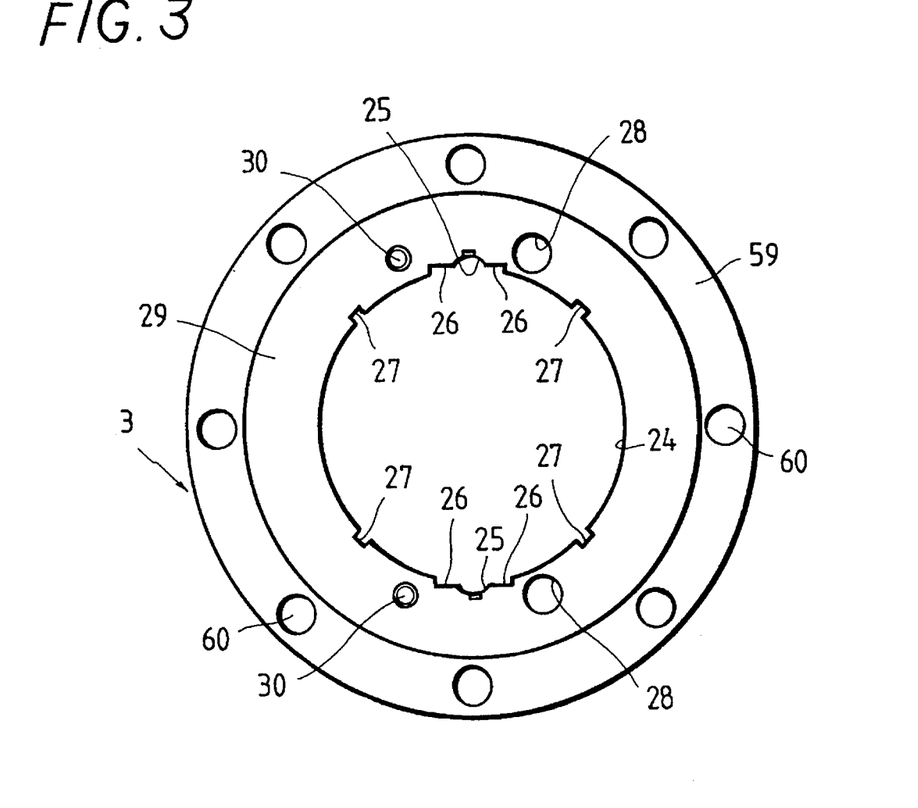
FIG. 3 is a front elevation showing an outer cylinder in the embodiment of FIG. 1.

As shown in FIG. 3, the outer cylinder 3 is formed to a cylindrical body provided with flanges 59 having fixing bores 60 via which a housing is fastened to the outer cylinder 3. The outer cylinder 3 is provided in the portions of its inner surface 24 which are opposed to the raceway grooves 2 in the ball spline shaft 1 with cross-sectionally V-shaped or arcuate raceway grooves 25 extending in the axial, i.e. lengthwise direction. At both side edges of each raceway groove 25, grooves 26 (first grooves) are formed so that these grooves 26 extend along the raceway groove 25 in the axial, i.e. lengthwise direction. The inner surface 24 of the outer cylinder 3 is also provided with grooves 27 (second grooves) extending so as to be spaced from the grooves 26, and in parallel with, in the lengthwise direction of, and on both sides of, the same grooves 26. The outer cylinder 3 is provided with return bores 28 (return passages) for the balls 10 so that the bores 28 extend in the lengthwise direction of the outer cylinder 3 and in parallel with the raceway grooves 25. Both of longitudinal end surfaces 29 of the outer cylinder 3 are provided with fixing bores 30 into which bolts 61 are screwed, for the purpose of attaching the spacer rings 37, end caps 48 and end seals 9 to the outer cylinder 3.

Figure 4:
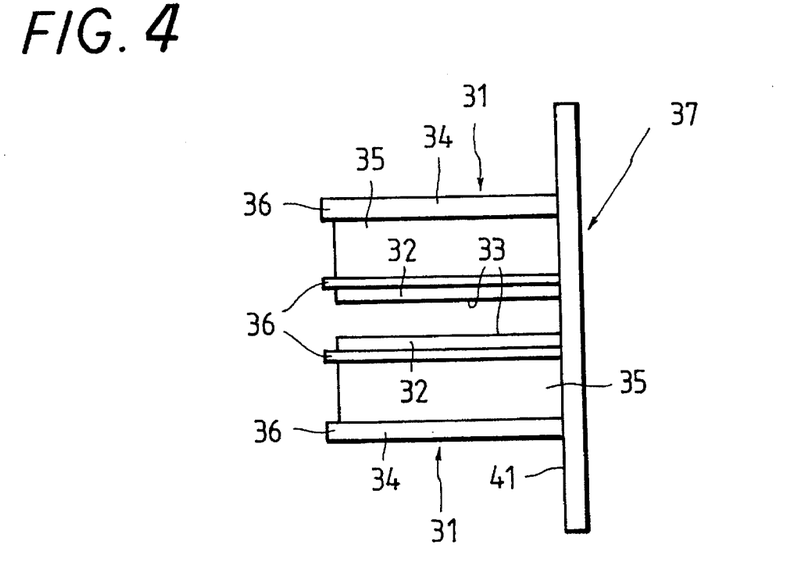
FIG. 4 is a plan view showing ball retaining units and a spacer ring in the embodiment of FIG. 1.
Figure 5:
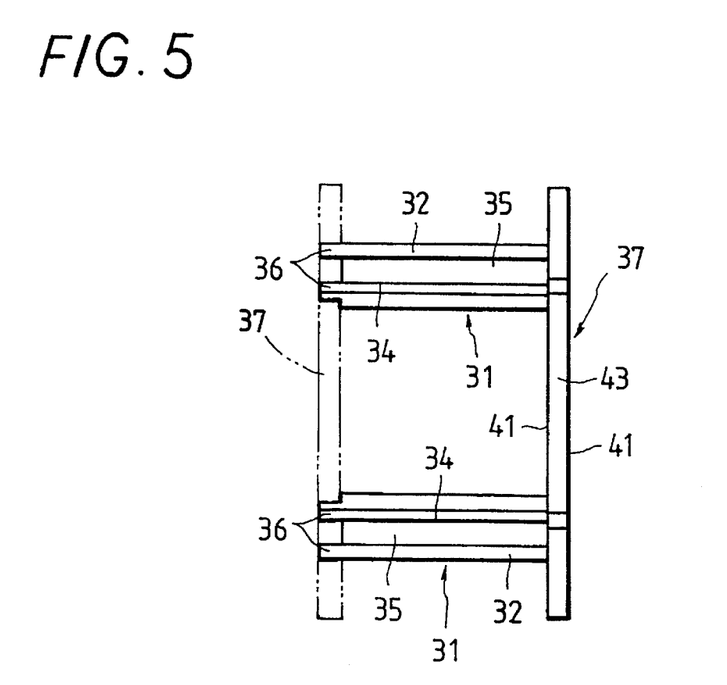
FIG. 5 is a side elevation showing the ball retaining units and spacer ring of FIG. 4.
Figure 6:
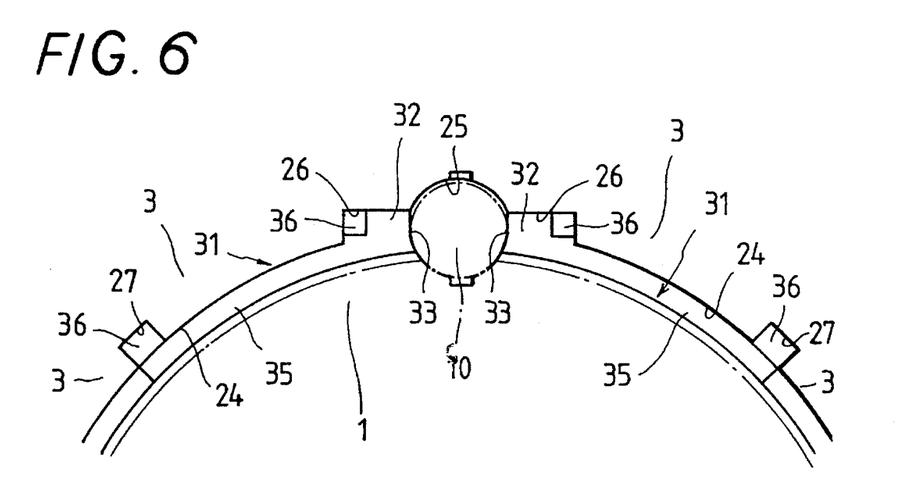
FIG. 6 is a schematic illustration showing the relation between the outer cylinder, ball retaining units and a ball spline shaft in the embodiment of FIG. 1.

The retainer combined with the outer cylinder 3 is formed by a pair of ball retaining units 31, i.e. two sets of ball retaining units comprising four ball retaining units 31 as shown in FIGS. 4 and 5, and retains two rows of balls 10 which roll in the raceway grooves 25 formed in two lines in the inner surface 24 of the outer cylinder 3. In the ball retaining units 31, ball retaining surfaces 33 which are basically formed on one side thereof are arranged in an opposed state at both edges of the raceway grooves 25 so as to hold the balls 10 rolling in the raceway grooves 25. The ball retaining surfaces 33 of the ball retaining units 31 are formed on the ends, which are on the side of the raceway grooves 25, of the ball retaining units, i.e. the sides thereof. Each ball retaining unit 31 is formed to a unitary structure on a side surface 38 of one spacer ring 37, and out of a synthetic resin or a metal. The ball retaining units 31 can, of course, be formed separately from the spacer rings 37. The same combined unitary structures can be formed by fixing each pair of ball retaining units to one spacer ring 37 respectively.

Each ball retaining unit 31 is formed by an arcuate plate 35 formed so as to be aligned with the inner surface 24 of the outer cylinder 3, and a ball retaining surface 33 is provided at one side of a lengthwise extending portion of the ball retaining unit 31, i.e. on the side of the ball retaining unit which is on the side the raceway groove 25. The outer cylinder 3 is provided with grooves 26 along both sides of the raceway grooves 25, and grooves 27 formed along and spaced from the grooves 26. Each ball retaining unit 31 is provided at both of the lengthwise extending edge portions thereof with a locking part, i.e. an outer projection 32 to be fitted in a groove 26 in the outer cylinder 3 and extending to outer lengthwise surface portions thereof, and a locking part, i.e. an outer projection 34 to be fitted in a groove 27 in the outer cylinder 3.

At both end portions of the outer projections 32, 34 extending radially outward from both side surfaces of each arcuate plate 35 of the ball retaining unit 31, locking projections 36 to be fitted in locking bores 46 formed in one spacer ring 37. The locking projections on the side of the outer projections 32 are formed at the corner portions of the grooves 26 so as to be opposed to the locking bores 46 formed in the spacer ring 37. Each locking projection 36 can be formed so as to have, for example, a polygonal cross section. The ball retaining units 31 can be fastened to one spacer ring 37 by engaging the locking projections 36 of the former with the locking bores 46 in the latter.

In order to fix a pair of ball retaining units 31 on both sides of a raceway groove 25 in the outer cylinder 3, they are positioned so that a distance between the ball retaining surfaces 33 of both of the ball retaining units 31 becomes slightly smaller than the diameter of each ball 10, and so that this distance permits the balls rolling in the load region of the raceway groove 25 in the outer cylinder 3 to be retained.

Figure 7:
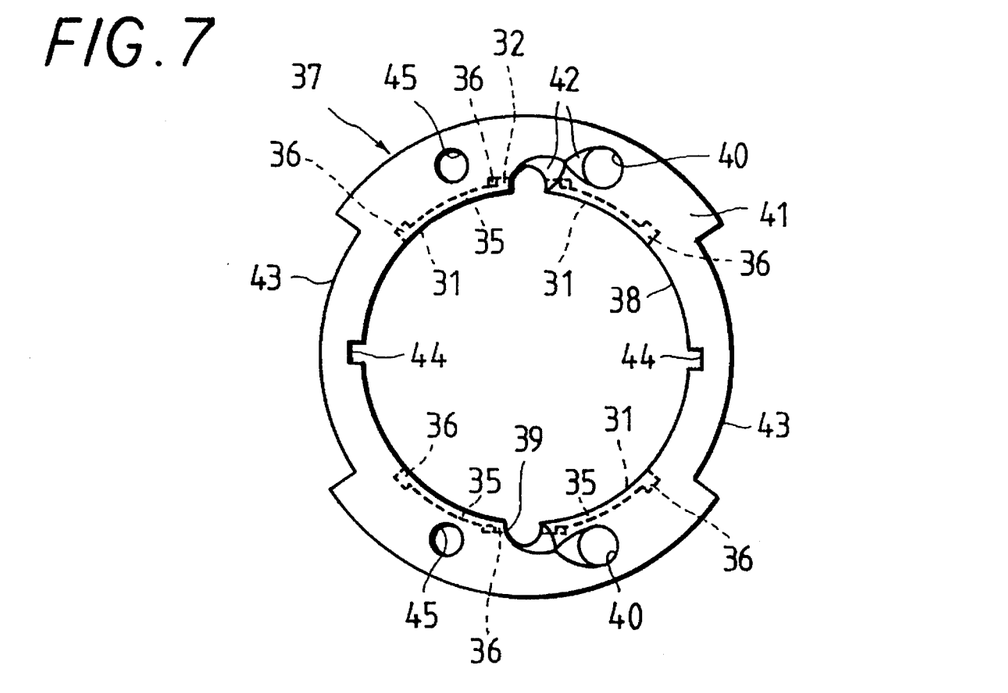
FIG. 7 is a front elevation showing one spacer ring and ball retaining units in the embodiment of FIG. 1.
Figure 8:
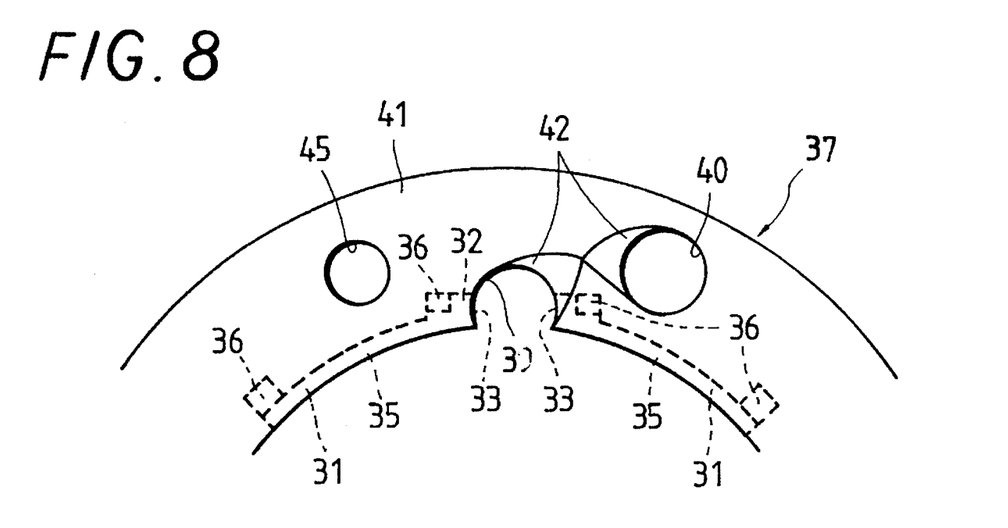
FIG. 8 is an enlarged front elevation showing a part of the spacer ring and a ball retaining unit of FIG. 7.
Figure 9:
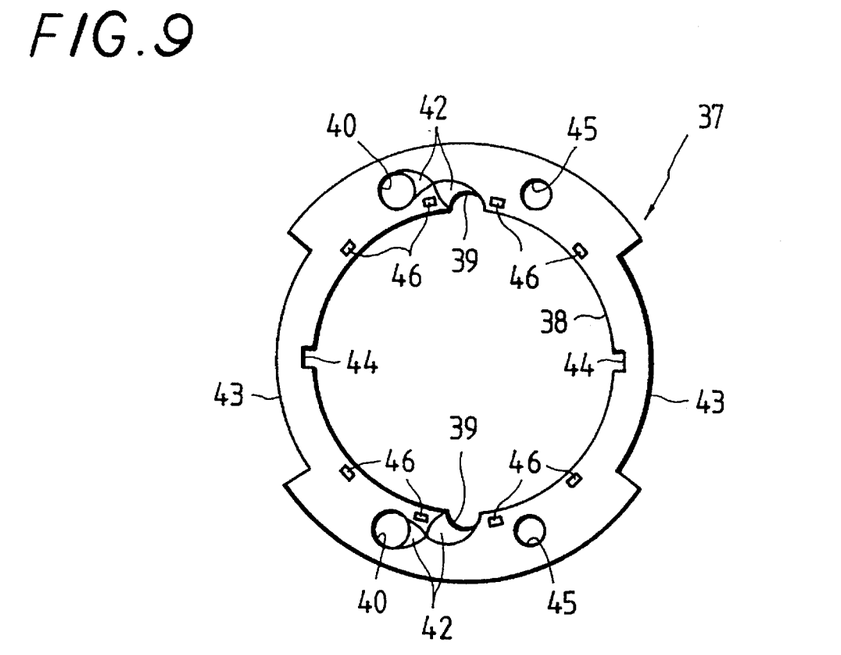
FIG. 9 is a front elevation showing the other spacer ring in the embodiment of FIG. 1.
Figure 10:
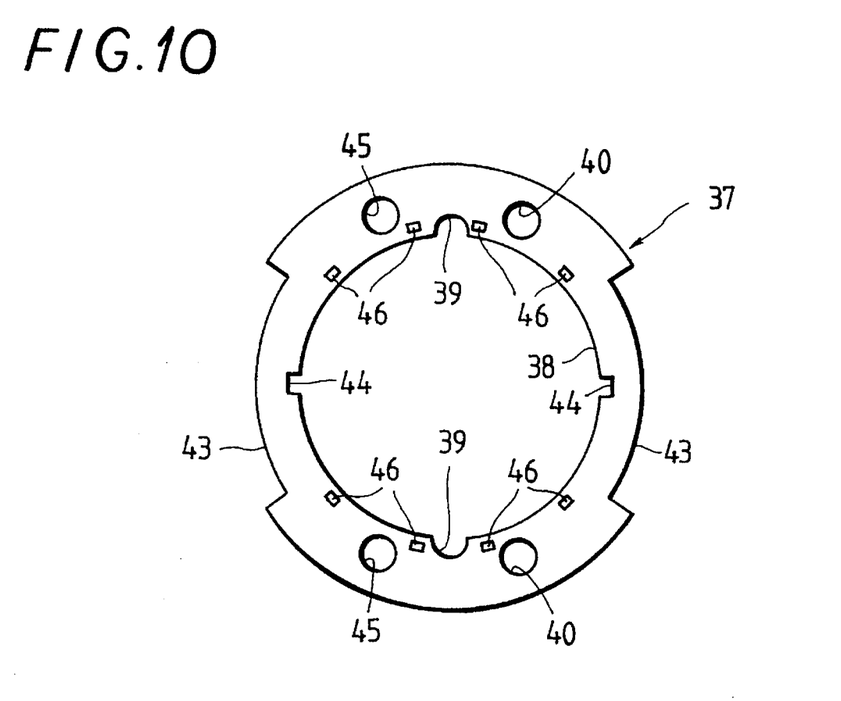
FIG. 10 is a rear elevation showing the spacer ring of FIG. 9.
Figure 12:
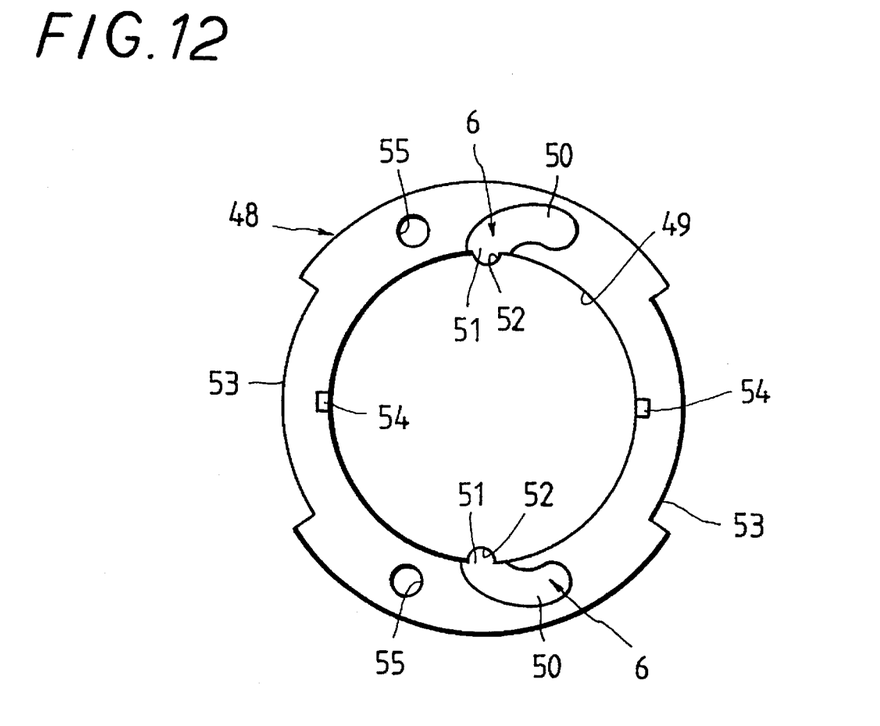
FIG. 12 is a rear elevation showing the end cap of FIG. 11.
Figure 13:
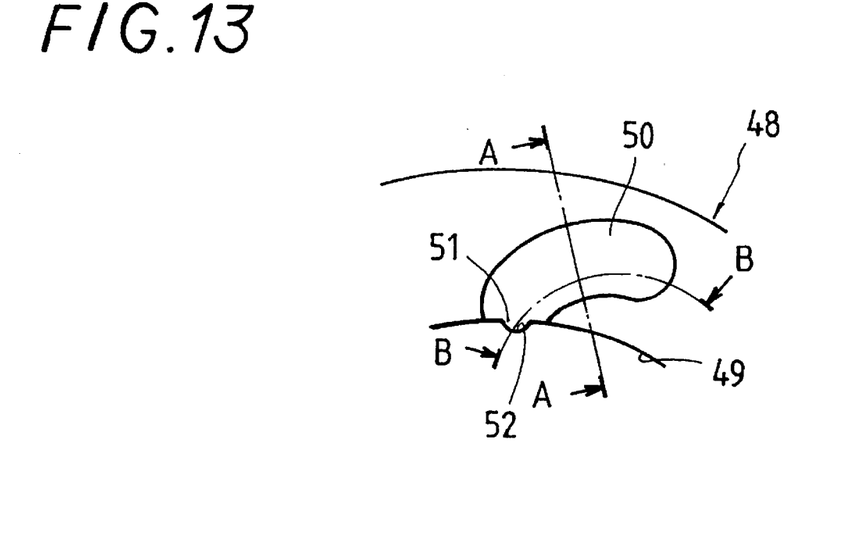
FIG. 13 is an enlarged rear elevation showing a part of the end cap of FIG. 12.
Figure 14:
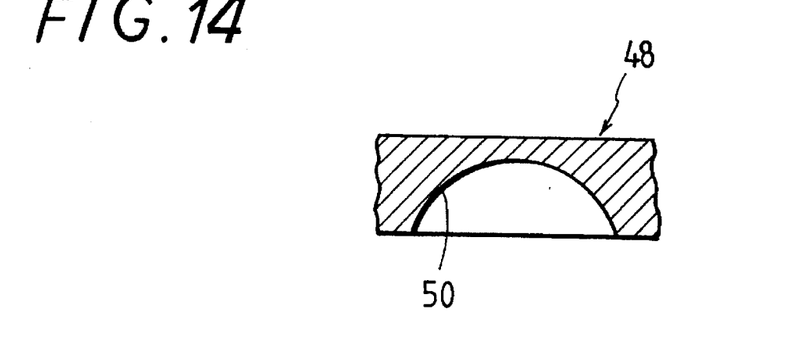
FIG. 14 is a sectional view taken along the line B—B in FIG. 13, showing a direction conversion passage formed in the end cap.
Figure 15:
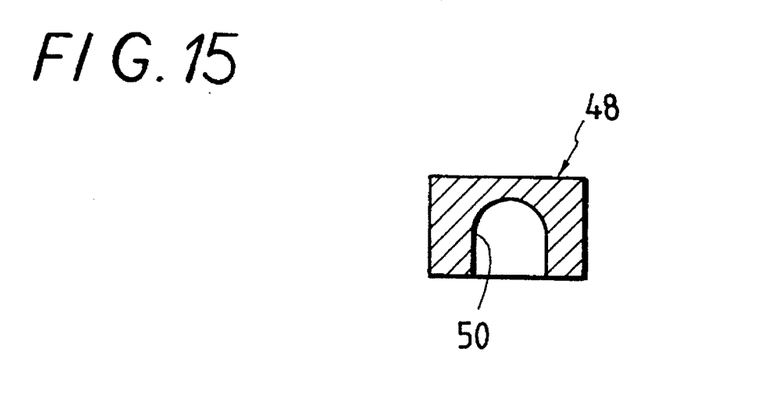
FIG. 15 is a sectional view taken along the line A—A in FIG. 13, showing the direction conversion passage formed in the end cap.

As shown in FIGS. 7–10, each spacer ring 37 is formed in the shape of a thin ring out of a synthetic resin or a metal. The spacer ring 37 is provided with communication grooves 39, which constitute passages communicating with the raceway grooves 25, in an inner surface 38 thereof, and communication bores 40 constituting passages communicating with the return bores 28. In a side surface 41, which is on the side of the end cap 48, of the spacer ring 37, the communication grooves 39 and communication bores 40 are joined together as shown in FIGS. 7 and 9. As shown in FIG. 12, each end cap 48 is provided with wall surfaces 50 defining the direction conversion passages 6. A side surface 41 of each spacer ring 37 is provided with wall surfaces 42 forming the direction conversion passages 6. Accordingly, the direction conversion passages 6 are formed by having the wall surfaces 50 of the end cap 48 and those 42 of the spacer ring 37 work in cooperation with each other. The spacer ring 37 is provided in its outer surface with arcuately cut escape recesses 43. It is also provided with recesses 44, which are used to position the spacer ring 37 with respect to the relative end cap 48, in its inner surface, and bolt inserting fixing bores 45.

Figure 11:
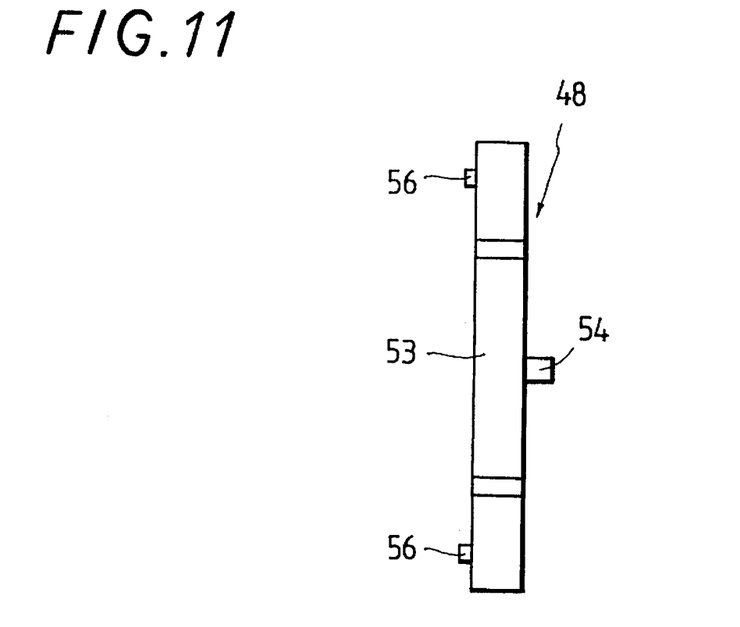
FIG. 11 is a side elevation showing an end cap in the embodiment of FIG. 1.

The end cap 48 shown in FIGS. 11 and 12 is formed in the shape of a ring out of a synthetic resin or a metal. The end cap 48 is provided in the surface thereof which contacts the spacer ring 37 with arcuate wall surfaces 50 which form the direction conversion passages 6 in cooperation with the wall surfaces 42 formed in the spacer ring 37. The end cap 48 is further provided on the portions of an inner surface 49 thereof which are opposed to the raceway grooves 2 in the ball spline shaft 1 with arcuate projections 51 engageable with the raceway grooves 2 and extending in the axial direction, in which projections 51 end surface portions 52 of the wall surfaces 50 of the direction conversion passages 6 are formed. Therefore, the end surface portions 52 of the wall surfaces 50 forming the direction conversion passages 6 are formed so as to extend radially outward beyond the communication grooves 39 formed in the spacer ring 37, and can guide the balls 10 smoothly in the regions in which the wall surfaces 50 forming the direction conversion direction passages 6 and the communication grooves 39 in the spacer ring 36 are connected together.

The endless ball circulating passages provided for rolling the balls 10 smoothly therein are formed by the raceway grooves 25 formed in the outer cylinder 3 to which the ball retaining units 31 are fastened, communication grooves 39 or communication bores 40 is the spacer rings 37, wall surfaces 50, i.e. direction conversion passages 6 formed in the end caps 48, and return bores 28 formed in the outer cylinder 3.

The end caps 48 and spacer rings 37 are provided with means for positioning them by engaging them with each other. Each spacer ring 37 is provided with a pair of recesses 44 diametrically opposed to each other, and each end cap 48 projections 54 engageable with the recesses 44.

Each end cap 48 is further provided at the portions thereof which correspond to the escape recesses 43, positioning recesses (or bores) 44 and fixing bores 45 formed in each spacer ring 37 with escape recesses 53, positioning projections 54 and fixing bores 55 respectively. The surface of each end cap 48 which is on the opposite side of the relative spacer ring is provided with projections 56 for positioning the relative end seal 9 when the end seal 9 is attached to the end cap 48. The spacer ring 37 and end cap 48 are provided in their outer surfaces with arcuately cut escape recesses 43, 53 in a mutually opposed state.

The end seals 9 are fixed to axial end surfaces of both end caps 48 for sealing the sliding portions thereof between the end caps and ball spline shaft 1, and each thereof is formed by fixing by burning a seal member 58 (refer to FIG. 1), which is made of an elastic material, such as rubber and a synthetic resin, to a core metal annularly made of a steel plate. Each end seal 9 is provided at the portions thereof which correspond to the escape recesses 53, fixing bores 55 and projections 56 formed in and on the end cap 48 with escape recesses 62, fixing bores and recesses respectively. The end caps 48 and end seals 9 are positioned by using the positioning means provided thereon, i.e. by engaging with each other the projections 56 formed on the end caps 48 and the recesses formed in the end seals 9. In order to reduce the sliding resistance of the seal members 58 with respect to the ball spline shaft 1, the seal members can be modified to partial seals adapted to seal the portions near the raceway grooves 25, or the portions of the seal members which are on the side of one surface of the ball spline shaft can be omitted.

Although the embodiment of the ball spline according to the present invention is constructed as described above, the construction thereof is not, of course, necessarily be limited to that of the embodiment. For example, a flange 59 having fixing bores 60, which is provided on the outer cylinder 3 shown in FIG. 3, so as to connect another part thereto may be replaced by another fixing means. The return bores 28 and fixing bores 30 provided in the outer cylinder 3 in a diametrically asymmetric manner may be formed in other suitably determined positions. A pair of raceway grooves 2, 25 are formed in both the ball spline shaft 1 and outer cylinder 3 in the embodiment but, for example, three raceway grooves may be formed in these parts, i.e., the number of the raceway grooves is not limited to that in the illustrated embodiment.

In this embodiment, ball retaining units 31 for holding a plurality of balls 10 are fixed to a side surface 41 of one spacer ring 37. An example formed by fixing one ball retaining unit 31 and one spacer ring 37 to each other into a unitary structure, preparing one more identical structure, and combining the two structures with each other vertically, may also be employed. An example formed by preparing ball retaining units 31 and spacer rings 37 separately, and combining these parts with each other may be employed. The ball retaining units 31 may be so formed that they are fixed to both edges of the raceway grooves 25 and retain the balls 10 rolling in the raceway grooves 25, and, for example, the width of the arcuate plates 35 can be suitably changed.

In the above-described embodiment, the positioning of the end caps 48 with respect to the spacer rings 37 is done by means of the projections 54 formed on the end caps 48 and the recesses 44 formed in the spacer rings 37. The recesses may be formed in the end caps 48, and the projections on the spacer rings 37. It is also possible to set the length of at least two locking projections 36 formed at the free ends of the ball retaining units to such a level that permits the locking projections 36 to project from the spacer ring 47 in which the projections 36 are fitted, and form positioning recesses, which are to be fitted around the portions of the locking projections which project from the spacer ring 47, in the relative end cap 48.

In order to assemble this ball spline, the outer projections 32, 34 on the ball retaining unit 31 are fitted in the grooves 26, 27 formed in the inner surface 24 of the outer cylinder 3, and the side surface 41 of the spacer ring 37 is engaged with the end surface 29 of the outer cylinder 3, the relative end cap 48 and end seal 9 being then positioned and laminated and fastened together with fixing bolts 61. the balls 10 are inserted from spaces formed by the portions of the ball retaining units 31 and raceway grooves 25 which are on the opposite side with respect to the outer cylinder 3, or from the return bores 28 into the endless circulating passages, and then the locking projections 36 of the ball retaining units 31 are fitted in the locking bores 46 in the other spacer ring 47, whereby the spacer ring is fastened to the ball retaining units 31. The relative end cap 48 and end seal 9 are then positioned and laminated, and fixed to the resultant product with fixing bolts 61.

What is claimed is:

1. A ball spline comprising a ball spline shaft provided with first raceway grooves in an outer surface thereof so that said raceway grooves extend in the lengthwise direction of said ball spline shaft; an outer cylinder fitted around said ball spline shaft and provided with second raceway grooves in the portions of an inner surface thereof which are opposed to said first raceway grooves, in such a manner that second raceway grooves extend in the lengthwise direction of said outer cylinder, and return bores formed so as to be spaced from said second raceway grooves; balls rolling between said first and second raceway grooves; retainers holding said balls in cooperation with said outer cylinder; spacer rings which are provided with passages respectively communicating with said second raceway grooves and said return bores, and which are disposed at both ends of said outer cylinder; end caps which are provided with direction conversion passages communicating with said passages in said spacer rings, and which are disposed on the end surfaces of said spacer rings; and end seals disposed on the end surfaces of said end caps, each of said retainers being formed by a pair of ball retaining units provided with ball retaining surfaces extending along said second raceway grooves in said outer cylinder, said ball retaining units arranged on the inner surface of said outer cylinder being engaged with and held by said spacer rings.

2. A ball spline according to claim 1, wherein said outer cylinder is provided with first grooves formed along both sides of said second raceway grooves, and second grooves formed along and spaced from said first grooves, said ball retaining units having on outer lengthwise extending surface portions thereof first outer projections fitted in said first grooves, and second outer projections fitted in said second grooves.

3. A ball spline according to claim 1, wherein each of said ball retaining units is formed arcuately in accordance with the cross-sectional shape of the inner surface of said outer cylinder, each of said ball retaining surfaces being formed on one lengthwise extending side portion of said ball retaining unit.

4. A ball spline according to claim 1, wherein said ball retaining units are provided at end portions thereof with locking projections, said spacer rings being provided with locking bores, said ball retaining units being retained by said spacer rings by engaging said locking projections on said ball retaining units with said locking bores in said spacer rings.

5. A ball spline according to claim 1, wherein said ball retaining units are formed unitarily with said spacer rings.

6. A ball spline according to claim 1, wherein said outer cylinder and said spacer rings are positioned by engaging said spacer rings with said ball retaining units via said ball retaining units fastened to said outer cylinder.

7. A ball spline according to claim 1, wherein said end caps and said spacer rings are provided with positioning means which are engaged with each other so as to position said end caps and said spacer rings.

8. A ball spline according to claim 7, wherein said positioning means comprises recesses formed in said spacer rings, and projections formed on said end caps and adapted to be engaged with said recesses.

9. A ball spline according to claim 1, wherein said end caps and said end seals are provided with positioning means which are engaged with each other so as to position said end caps and said end seals.

10. A ball spline according to claim 1, wherein said spacer rings and said end caps are provided in their respective outer surfaces with arcuately cut escape recesses which are opposed to each other.

\* \* \* \* \*